US010970003B2

(12) United States Patent
McGlaughlin et al.

(10) Patent No.: US 10,970,003 B2
(45) Date of Patent: *Apr. 6, 2021

(54) SCALABLE LOW-LATENCY STORAGE INTERFACE

(71) Applicant: Micron Technology, Inc., Boise, ID (US)

(72) Inventors: Edward McGlaughlin, Minneapolis, MN (US); Yves Tchapda, Manchester (GB); Stephen Marshall, Oldham (GB); Samuel Bradshaw, Sacramento, CA (US); Niels Reimers, Meadow Vista, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/681,316

(22) Filed: Nov. 12, 2019

(65) Prior Publication Data

US 2020/0081659 A1    Mar. 12, 2020

Related U.S. Application Data

(63) Continuation of application No. 15/485,877, filed on Apr. 12, 2017, now Pat. No. 10,503,434.

(51) Int. Cl.
*G06F 3/06* (2006.01)
*G06F 13/42* (2006.01)
(Continued)

(52) U.S. Cl.
CPC ............ *G06F 3/0659* (2013.01); *G06F 3/061* (2013.01); *G06F 3/0656* (2013.01);
(Continued)

(58) Field of Classification Search
CPC ...... G06F 3/061; G06F 3/0656; G06F 3/0659; G06F 3/0679; G06F 12/0238;
(Continued)

(56) References Cited

U.S. PATENT DOCUMENTS 6,189,033 B1 * 2/2001 Jin .................... H04L 29/12009
                                                       709/225
9,092,429 B2    7/2015 Higham et al.
(Continued)

FOREIGN PATENT DOCUMENTS

CN       110730945       1/2020
WO    WO-2018191124 A1  10/2018

OTHER PUBLICATIONS

"International Application Serial No. PCT/US2018/026527, International Preliminary Report on Patentability dated Oct. 24, 2019", 11 pgs.

(Continued)

*Primary Examiner* — Eric T Oberly
(74) *Attorney, Agent, or Firm* — Schwegman Lundberg & Woessner, P.A.

(57) ABSTRACT

Systems and methods are disclosed, including a host interface circuit configured to control communication between a set of virtual functions (VFs) and a media management system (MMS). The host interface circuit can consolidate commands from the set of VFs, dynamically allocate write buffers (WBs) from a set of available WBs to the set of VFs using the commands, and manage WB access for the set of VFs and provide write data to the MMS using the allocated WBs. For each VF in the set of VFs, the host interface circuit can manage a submission queue (SQ) for a respective VF from the set of VFs, receive a command from the respective (Continued)

VF, including one or more submission queue entries (SQEs), and coordinate the one or more received SQEs with allocated WBs.

16 Claims, 8 Drawing Sheets

(51) Int. Cl.
 *G06F 13/16* (2006.01)
 *G06F 12/02* (2006.01)
(52) U.S. Cl.
 CPC .......... *G06F 3/0679* (2013.01); *G06F 13/161* (2013.01); *G06F 13/1673* (2013.01); *G06F 13/4282* (2013.01); *G06F 12/0238* (2013.01); *G06F 2212/1024* (2013.01); *G06F 2212/202* (2013.01); *G06F 2212/205* (2013.01); *G06F 2212/7201* (2013.01); *G06F 2212/7203* (2013.01); *G06F 2213/0026* (2013.01)
(58) Field of Classification Search
 CPC ............... G06F 13/161; G06F 13/1673; G06F 13/4282; G06F 2212/1024; G06F 2212/202; G06F 2212/205; G06F 2212/7201; G06F 2212/7203; G06F 2213/0026
 See application file for complete search history.

(56) References Cited

U.S. PATENT DOCUMENTS

| 10,007,443 | B1* | 6/2018 | Rajadnya | G06F 3/0613 |
| 10,503,434 | B2 | 12/2019 | McGlaughlin et al. | |
| 2016/0267016 | A1 | 9/2016 | Lee et al. | |
| 2016/0283116 | A1 | 9/2016 | Ramalingam | |
| 2016/0291866 | A1 | 10/2016 | Olcay et al. | |
| 2016/0292007 | A1 | 10/2016 | Ding et al. | |
| 2016/0306549 | A1 | 10/2016 | Nadakuditi et al. | |
| 2017/0024132 | A1* | 1/2017 | Jun | G06F 3/0604 |
| 2017/0097909 | A1 | 4/2017 | Simionescu et al. | |
| 2018/0300064 | A1 | 10/2018 | McGlaughlin et al. | |

OTHER PUBLICATIONS

"International Application Serial No. PCT/US2018/026527, International Search Report dated Aug. 23, 2018", 3 pgs.

"International Application Serial No. PCT/US2018/026527, Written Opinion dated Aug. 23, 2018", 9 pgs.

Vucinic, Dejan, et al., "DC Express: Shortest Latency Protocol for Reading Phase Change Memory over PCI Express", Proceedings of the 12th Usenix Conference on File and Storage Technologies, (Feb. 2014), 309-315.

"European Application Serial No. 18784568.0, Response filed May 29, 2020 to Communication pursuant to Rules 161(2) and 162 EPC dated Nov. 21, 2019", 6 pgs.

"European Application Serial No. 18784568.0, Extended European Search Report dated Jan. 11, 2021", 9 pgs.

* cited by examiner

SCALABLE LOW-LATENCY STORAGE INTERFACE

PRIORITY APPLICATION

This application is a continuation of U.S. application Ser. No. 15/485,877, filed Apr. 12, 2017, which is incorporated herein by reference in its entirety.

BACKGROUND

In modern computing technologies, memory devices are typically internal, semiconductor, integrated circuits in computers or other electronic devices, and can be categorized as either volatile memory or non-volatile memory (NVM).

Volatile memory requires power to maintain its data, and includes random-access memory (RAM), static random-access memory (SRAM), dynamic random-access memory (DRAM), or synchronous dynamic random-access memory (SDRAM), among others.

In contrast, non-volatile memory (NVM) can retain stored data when not powered, and includes flash memory, read-only memory (ROM), electrically erasable programmable ROM (EEPROM), erasable programmable ROM (EPROM), resistance variable memory, phase change random-access memory (PCRAM), resistive random-access memory (RRAM), or magnetoresistive random-access memory (MRAM), among others.

Each category or subcategory is advantageous in specific settings. For example, DRAM, typically comprising one transistor and one capacitor per bit, is structurally very simple in contrast to other memory types (SRAM, etc.), and as such, is widely used in applications requiring low cost or high capacity. In contrast, SRAM, typically comprising four to six transistors per bit, is faster than DRAM, and, as such, is typically used in applications where speed is a greater concern than cost.

For each category or subcategory, however, improved data transfer speeds, such as reduced latency, are desired.

SUMMARY

This document discusses, among other things, an apparatus or system, such as a host interface circuit configured to control communication between one or more virtual functions (VFs) and a media management system (MMS), coupled to, or including, one or more non-volatile memory (NVM) media devices. The host interface circuit can consolidate commands from one or more client devices or the set of VFs, dynamically allocate write buffers (WBs) from a set of available WBs to the set of VFs using the commands, and manage WB access for the set of VFs and provide write data to the MMS using the allocated WBs. For each VF in the set of VFs, the host interface circuit can manage one or more submission queues (SQs) for a respective VF from the set of VFs, receive a command from the respective VF, including one or more submission queue entries (SQEs), and coordinate the one or more received SQEs with allocated WBs.

The host interface circuit can be configured to determine if there are sufficient resources to hold the one or more received SQEs in the SQ. For example, if there are sufficient resources to hold the one or more received SQEs in a submission queue (SQ), the host interface circuit can be configured to add the one or more received SQEs to the SQ. If there are insufficient resources to hold the one or more received SQEs in the SQ, the host interface circuit can be configured to provide a command failure notification, such as to a client device coupled through a communication interface, or to the respective VF or one or more VFs from the set of VFs, etc.

Methods of operation of such apparatus or systems are disclosed, as well as machine-readable medium, and other embodiments.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION OF PREFERRED EMBODIMENTS

Figure 1:
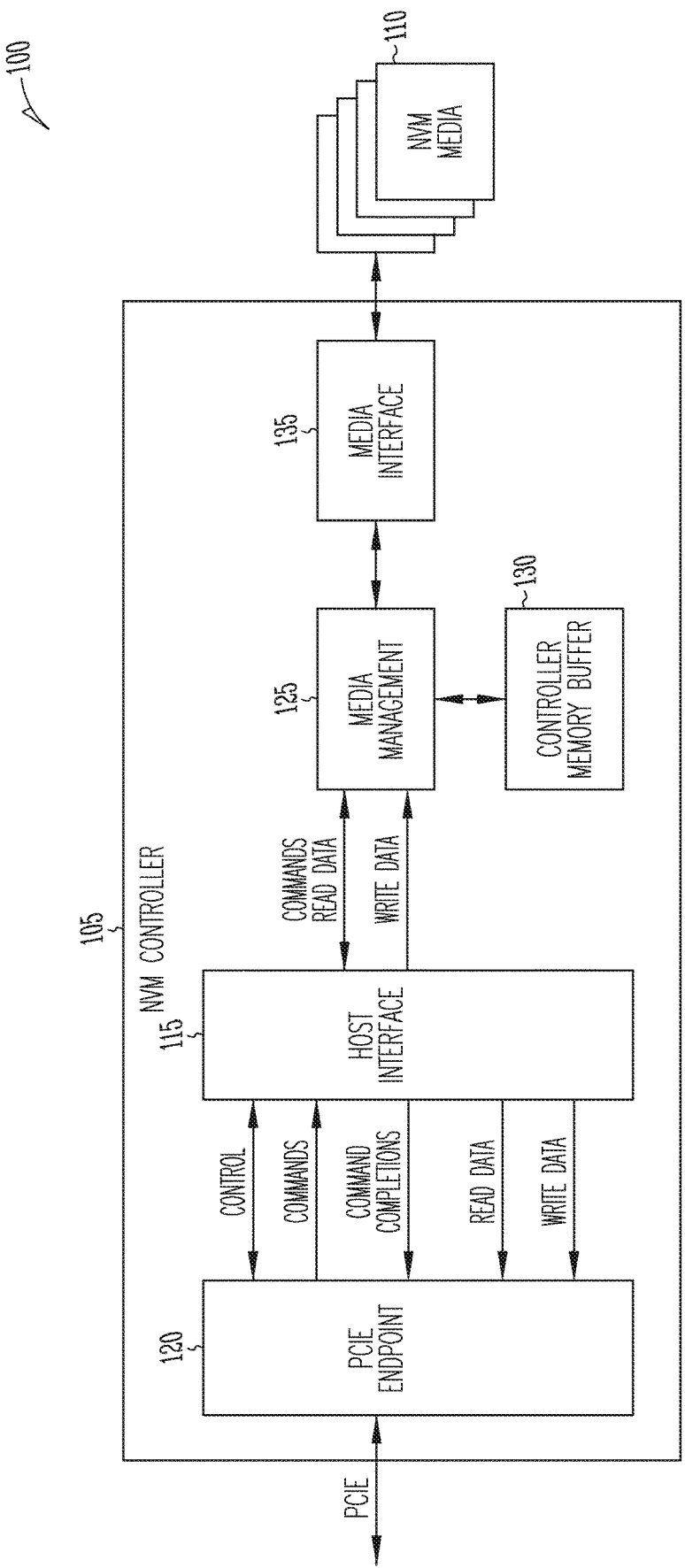
FIG. 1 illustrates an example low-latency non-volatile memory (NVM) system including an NVM controller and a set of NVM media devices.

Emerging non-volatile memory (NVM) technologies offer significantly reduced latencies for storing and retrieving data, such that inherent latencies in existing NVM interface protocols have become a limiting factor in overall system performance. Alternative schemes for reducing NVM interface latency, such as the use of polling versus interrupts, or pushing command, scatter-gather lists, or write data into NVM, attempt to solve such issues. However, scalable flow control of such schemes to a large number of storage clients exposed to non-volatile media using virtual function (VF) abstraction remains a challenge.

The present inventors have recognized, among other things, apparatus, systems, and methods to provide scalable, efficient, high-throughput, low-latency access to non-volatile memory (NVM) for one or more virtual functions (VFs) through a communication interface, such as a peripheral component interconnect express (PCIe) or other interface. VFs can include, in certain examples, thinly provisioned apertures in a storage controller that enable or isolate multiple storage clients. In an example, an NVM controller can receive commands from the one or more VFs, such as one or more submission queue entries (SQEs) corresponding to one or more logical blocks of write data, and dynamically allocate write buffers (WBs) from a set of available WBs to the one or more VFs coordinated with the one or more SQEs. The NVM controller can provide data from an allocated WB to the NVM media device as it is received, for example, before all logical blocks of data for a specific SQE are received, increasing the transfer speed of write data to the NVM media device. In one specific example, using the apparatus, systems, and methods disclosed herein, an increased transfer speed of 0.8 μsec per each logical block of write data following the initial logical block can be achieved. In a 4 logical block address (LBA) write data transfer to the NVM media device, a 2.4 μsec savings can be realized in contrast to an equivalent write data transfer using traditional storage systems or write data transfer schemes.

Further, the NVM controller can reallocate WBs after a successful write to the NVM media device, such that, in certain examples, individual WBs can provide multiple transfers of write data from a client device to the NVM media device for a single SQE. Such apparatus, systems, and methods can reduce hold time for WBs prior to write, as well as the time until the next write, reducing total WB count requirement (e.g., inversely proportionate to the average write size), and eliminating or reducing problems relating to client device failure while holding data, either in the WBs associated with the NVM controller, or the client device.

For example, the apparatus, systems, and methods described herein are scalable to a large number of virtual server clients using minimum controller resources (e.g., efficiently using controller memory buffer for command queueing and writing data, or "thin provisioning"), avoiding latencies found in traditional storage systems (e.g., NVM express (NVMe) solid-state drive (SSD) storage systems) or other write data transfer schemes, representing improvements over, and in certain examples of, existing hardware. For example, latencies associated with providing logical block address (LBA) commands to the NVM media device are reduced. In addition, single-sector write capabilities are provided, eliminating the need for a pre-allocate process step (e.g., saving 1 μsec of request/allocate handshake time, etc.). Further, as WBs are free to receive additional data after a completed write to the NVM media device, deadlock due to partial allocation of resources is avoided, improving overall system reliability.

In various examples, addressability requirements in a base address register (BAR) space are reduced. As an LBA value can be determined using SQE values, the need to fully map the LBA range within the BAR space is eliminated, allowing for addressability of large capacity NVM systems in the BAR space (e.g., a base register access #1 (BAR1) space, etc.).

FIG. 1 illustrates an example non-volatile memory (NVM) system 100 including an NVM controller 105 configured to control communication between one or more virtual functions (VFs) and a set of NVM media devices 110 through one or more communication interfaces, such as a peripheral component interconnect express (PCIe) interface. In an example, the NVM controller 105 can include a host interface circuit 115, a PCIe endpoint 120, and a media management system (MMS) 125. In an example, one or more clients or other devices can be coupled to the NVM system 100 or the one or more VFs using the communication interface.

The one or more VFs can receive commands, such as from one or more client devices through one or more communication interfaces (e.g., the PCIe endpoint 120). In an example, the PCIe endpoint 120 can include one or more communication interfaces selectively coupled to a large number of VFs, such as a number of client servers or other client devices, etc.

The host interface circuit 115 can receive commands from the one or more VFs or client devices. The commands can include, among others, a write command, a read command, or one or more other commands or instructions. The write command can include one or more submission queue entries (SQEs) to write data to the MMS 125, and the read command can include an instruction to read data from the MMS 125 and provide data to one or more VFs or client devices.

The host interface circuit 115 can be configured to receive one or more submission queues (SQs) or SQEs, and coordinate the one or more received SQs or SQEs with available write buffers (WBs) from a set of WBs associated with the host interface circuit 115. The host interface circuit 115 can manage WB access for the one or more VFs to the available WB. In an example, the one or more VFs can create one or more virtual SQs to receive the SQEs from one or more client devices. If sufficient WBs are available for an SQE, the host interface circuit 115 can accept the SQE, create an intermediate representation (e.g., a "context") of an associated transaction, allocate one or more WBs required for the SQE, and use the one or more allocated WBs to transfer data to the MMS 125.

The host interface circuit 115 can provide notifications about the available WBs or the MMS 125, such as a command execution status or read data, to the client requesting the transaction, such as the one or more VFs or client devices, as applicable. In an example, the command execution status can include whether data associated with a received write command is successfully written into the MMS 125, whether there are insufficient resources to hold the one or more received SQEs in the SQ, or one or more other errors or notifications (e.g. in-band errors, more costly out-of-band errors, etc.).

The NVM controller 105 further includes a controller memory buffer 130 and a media interface 135 between the NVM media device 110 and the MMS 125. In certain examples, the MMS 125 include one or more of the controller memory buffer 130, the media interface 135, or the NVM media device 110 (e.g., one or more non-volatile memory media devices, each having one or more memory arrays, each having a plurality of memory cells, etc.). In an example, the media interface can include one or more physical interfaces to transfer data between the NVM media device 110 and the host interface circuit 115. In an example, the NVM media device 110 can be a separate component from the MMS 125 or the NVM controller 105.

The host interface circuit 115 or the MMS 125 can include, among other things, circuitry or firmware, such as a number of components or integrated circuits. For example, the host interface circuit 115 can include one or more memory control units, circuits, or components configured to control access across the MMS 125 and to provide a translation layer between the one or more VFs and the NVM media device 110. The host interface circuit 115 can include one or more input/output (I/O) circuits, lines, or interfaces to transfer data to or from the NVM media device 110.

Figure 2:
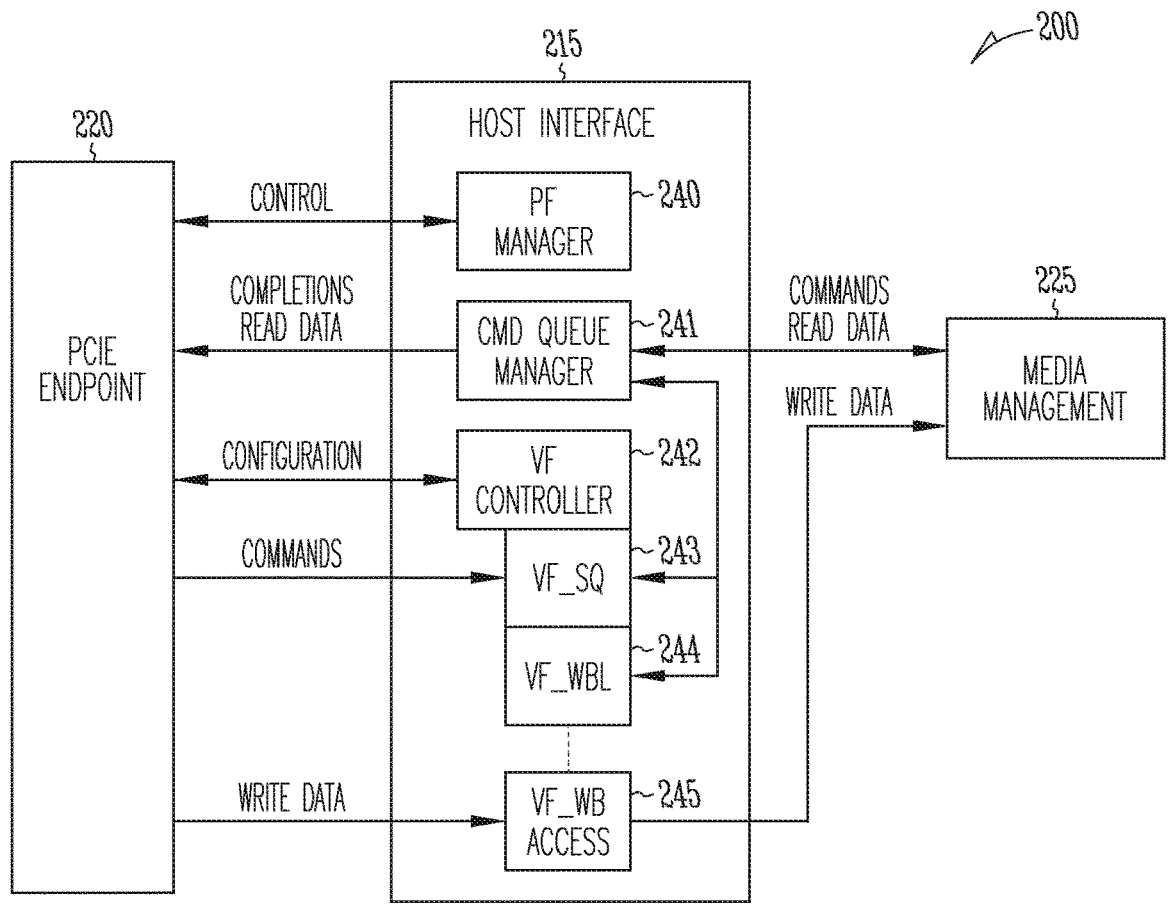
FIG. 2 illustrates an example host interface system including a peripheral component interconnect express (PCIe) endpoint, a host interface circuit, and a media management system (MMS).

FIG. 2 illustrates an example host interface system 200 including a peripheral component interconnect express (PCIe) endpoint 220, a host interface circuit 215, and a media management system (MMS) 225. The host interface circuit 215 can be configured to control communication between one or more virtual functions (VFs), coupled to the PCIe endpoint 220, and the MMS 225.

The host interface circuit 215 can include one or more of a physical function (PF) manager circuit 240, a command (CMD) queue manager circuit 241, a VF controller 242, a VF submission queue (VF_SQ) circuit 243, a VF write buffer list (VF_WBL) circuit 244, and a VF write buffer (VF_WB) access circuit 245. In other examples, the host interface circuit 125 can include one or more other controllers or control circuits.

In an example, the PF manager circuit 240 can provide overall control of the host interface circuit 215, and can send or receive control information (CONTROL) to or from the one or more VFs through the PCIe endpoint 220. As described above, in other examples, the PCIe endpoint 220 can include one or more other communication interfaces.

The CMD queue manager circuit 241 can be configured to consolidate commands across the one or more VFs, such as through the VF_SQ circuit 243, and provide commands (COMMANDS), such as the consolidated commands, to the MMS 225. In an example, commands can include submission queue entry (SQE) commands from the one or more VFs. The CMD queue manager circuit 241 can receive command completion from the MMS 225, and can manage handshake and other communication or interrogation to or from the MMS 225.

For example, the CMD queue manager circuit 241 can rotate through the submission queues (SQs) for the one or more VFs in the host interface circuit 215 that are ready to be written to the MMS 225. The CMD queue manager circuit 241 can provide references for allocated write buffers (WBs) from a write buffer list (WBL) for write commands. Services can include via round robin, or may include weighted or full quality of service mechanisms. A given SQE may be sent to the MMS 225 repeatedly with one or more logical block address (LBA) buffers (e.g., WBs), along with the relative offset from a starting LBA for the SQE. As each LBA buffer is sent to the MMS 225, the LBA buffer is removed from a WBL, allowing it to be free to be allocated to one or more additional or new SQEs from one or more VFs. In an example, the MMS 225 can push command completions to the CMD queue manager circuit 241, who can provide notifications, including command completions, to the VF, a client device, etc.

The CMD queue manager circuit 241 can be configured to receive read data (READ DATA) from the MMS 225, and provide read data (READ DATA), or a representation of the read data, from the MMS 225 to the one or more VFs or client devices through the PCIe endpoint 220. Further, the CMD queue manager circuit 241 can be configured to provide notifications, such as completions (COMPLETIONS) (e.g., command completions, write completions, etc.) to the one or more VFs or client devices through the PCIe endpoint 220.

The VF controller 242 can be configured to send or receive configuration information (CONFIGURATION) to or from the PCIe endpoint 220 or the one or more VFs through the PCIe endpoint 220, and to manage and control the one or more VFs using the configuration information (CONFIGURATION). The VF controller 242 can further include or be coupled to one or both of the VF_SQ circuit 243 and the VF_WBL circuit 244, and can be configured to manage or control the one or more VFs using information from the VF_SQ circuit 243 or the VF_WBL circuit 244.

The VF_SQ circuit 243 can be configured to receive commands (COMMANDS) from the PCIe endpoint 220, and in certain examples, can provide the commands to the CMD queue manager circuit 241, or receive information from the CMD queue manager circuit 241. In an example, the commands can be received from the one or more VFs through the PCIe endpoint 220. In an example, the host interface circuit 215 can include a number of VF_SQ circuits, such as a plurality of VF_SQ circuits, one or more per VF, etc. In certain examples, the commands can include one or more submission queue entries (SQEs), for example, to write data to the MMS 225, including one or more non-volatile memory (NVM) media devices, etc.

The VF_WBL circuit 244 can be configured to manage a list of pending data writes, such as from the one or more VFs to the MMS 225. In an example, the host interface circuit 215 can include a number of VF_WBL circuits, such as a plurality of VF_WBL circuits, one per VF, etc. The VF_WBL circuit 244 can be configured to manage a set of write buffers (WBs), and to coordinate the one or more received SQEs from the VF_SQ circuit 243 with available WBs from the set of WBs. In certain examples, the VF_WBL circuit 244 can be configured to receive information from, or provide information to, one or more of the VF_SQ circuit 243, the VF controller 242, or the CMD queue manager circuit 241.

The VF_WB access circuit 245 can be configured to receive information from one or more of the VF_WBL circuit 244, the VF_SQ circuit 243, or the VF controller 242, and to manage WB access for the one or more VFs and to provide write data from the one or more VFs to the MMS 225.

Figure 3:
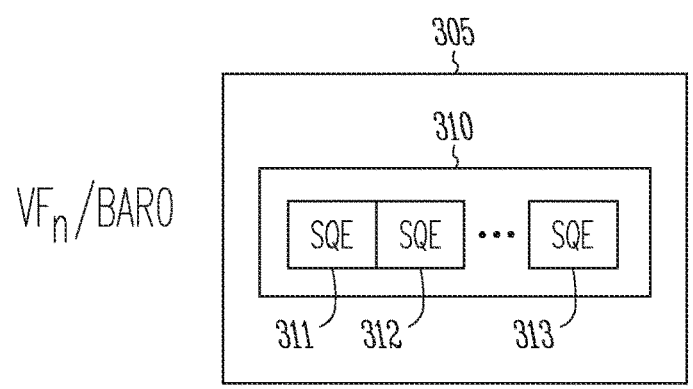
FIG. 3 illustrates an example virtual function (VF) submission queue (SQ).
Figure 4:
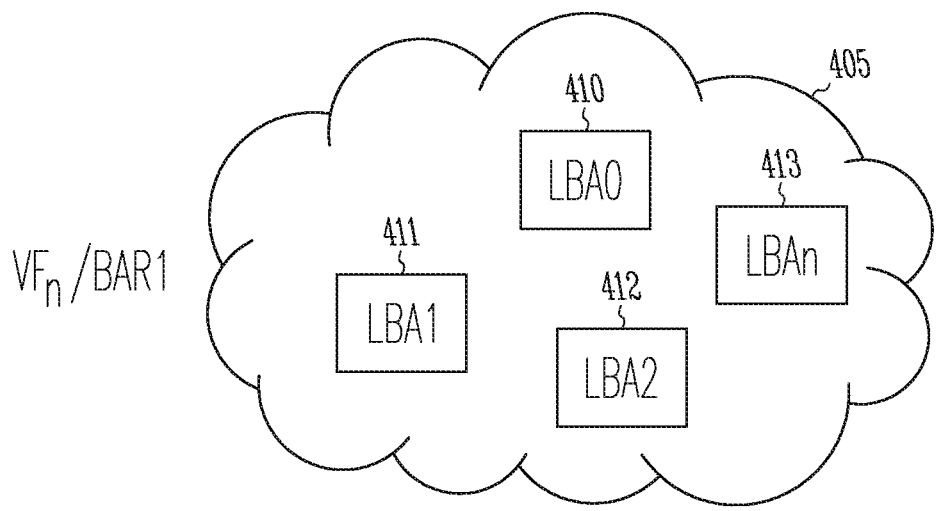
FIG. 4 illustrates an example write buffer (WB).

FIGS. 3 and 4 illustrate example data structures to support a controller memory buffer, a submission queue (SQ), and write buffers (WBs) of a host interface circuit. Such structures can be replicated across one or more VFs, and can be accessed by the host interface circuit through base address registers (BARs) of the communication interface or the one or more VFs.

FIG. 3 illustrates an example virtual function (VF) submission queue (SQ) 305 for an individual VF ($VF_n$). Such structure can be replicated across one or more VFs, and can be accessed using a base address register #0 (BAR0) of a communication interface for the $VF_n$. In other examples, such structure can be accessed using any full or partial region of any of the base address registers (BARs) exposed in the one or more VFs. In an example, the VF SQ 305 can include an SQ 310 having one or more submission queue entries (SQEs), such as first, second, and third SQEs 311, 312, 313. A host interface circuit, can receive the one or more SQEs of the $VF_n$ for read and write commands.

FIG. 4 illustrates an example virtual function (VF) write buffer (WB) 405 for an individual VF ($VF_n$). Such structure can be replicated across one or more VFs, and can be accessed using a base address register #1 (BAR1) for the $VF_n$. In an example, the VF WB 405 can include one or more logical blocks of write data, such as logical block address 0 (LBA0) 410, logical block address 1 (LBA1), logical block address 2 (LBA2) 412, and logical block address n (LBAn) 413, etc. A host interface circuit can receive the one or more logical blocks of write data from BAR1 of the $VF_n$ for write commands, but, in certain examples, does not receive the one or more logical blocks of write data from BAR1 during read commands. In an example, read data can be transferred directly from the host interface circuit to a client device. On other examples, one or more other base address register (BAR) space can be used, as desired.

In certain examples, the apparatus, systems, and methods described herein can eliminate the need to fully map the LBA range within the BAR1 space, allowing addressability of large capacity NVM systems. The LBA value can be determined explicitly through submission queue entry (SQE) values (e.g., using an initial LBA and an order in a submission queue (SQ), etc.). Such determination can significantly reduce the size of the BAR1 address register requirements for the individual VF, in certain examples, reducing the logic gates required in a chip design dependent on the implementation method. Further, such determination can remove constraints associated with BAR space limits (e.g., a PCIe BAR space limit of 500 MB), in certain examples, allowing NVM media device capacities of multiple Terabytes, or greater.

A client device can issue a command by writing a new SQE to BAR0. The host interface circuit can internally manage adding the new SQE to the SQ of the host interface circuit. If there are insufficient resources to hold the new SQE in the SQ, the host interface circuit can be configured to return a command completion notification to the VF, reflecting command failure. In certain examples, command completion notification can include an optional status indicating a resource overflow/exhaustion scenario. In an example, the host interface circuit can optionally suggest that the client device not resubmit the command for a period of time (e.g., fixed or random, etc.). The suggested period of time for resubmission can originate from the host interface circuit, reflecting some estimate of resource availability reconciled with client write requests that were met with similar responses. In contrast, if there are sufficient resources to hold the new SQE, the host interface circuit can allocate a first WB for the data associated with the new SQE.

Once the first WB is allocated, a first logical block of data can be written to the first WB using BAR1. The host interface circuit can initiate commitment of data in write data buffer to the MMS, including one or more NVM media devices. Concurrently, the remaining logical blocks of data can be written to BAR1 until the full length of the write operation has been transferred to the host interface circuit.

In an example, if there are insufficient resources to handle write data buffering for the command (e.g., one or more received SQEs), the host interface circuit can send an intermediate completion notification indicating the number of WBs that have transferred data to the MMS. The intermediate or early completion notification can help the client device abort the push operation, and can signify to the client device that the associated command may be more latent than one in which resources were available. In an example, the client device can poll for final completion, and if there is no other transactions to submit or productive work to do, it may wait for an asynchronous interrupt before reaping the final completion, performing other work in the meantime. The remaining portion of the write data for the command can be transferred to the MMS using one or more traditional data transfer schemes, such as pulled by the host interface circuit from the client device or VF using DMA semantics, etc. When the write command has been completed, the host interface circuit can add a completion queue entry to the command queue manager circuit with a write command status, update a phase tag, and optionally, a command queue tail. In certain examples, the completion queue entry can represent a final completion to the client device, indicating that cleanup can be made.

Figure 5:
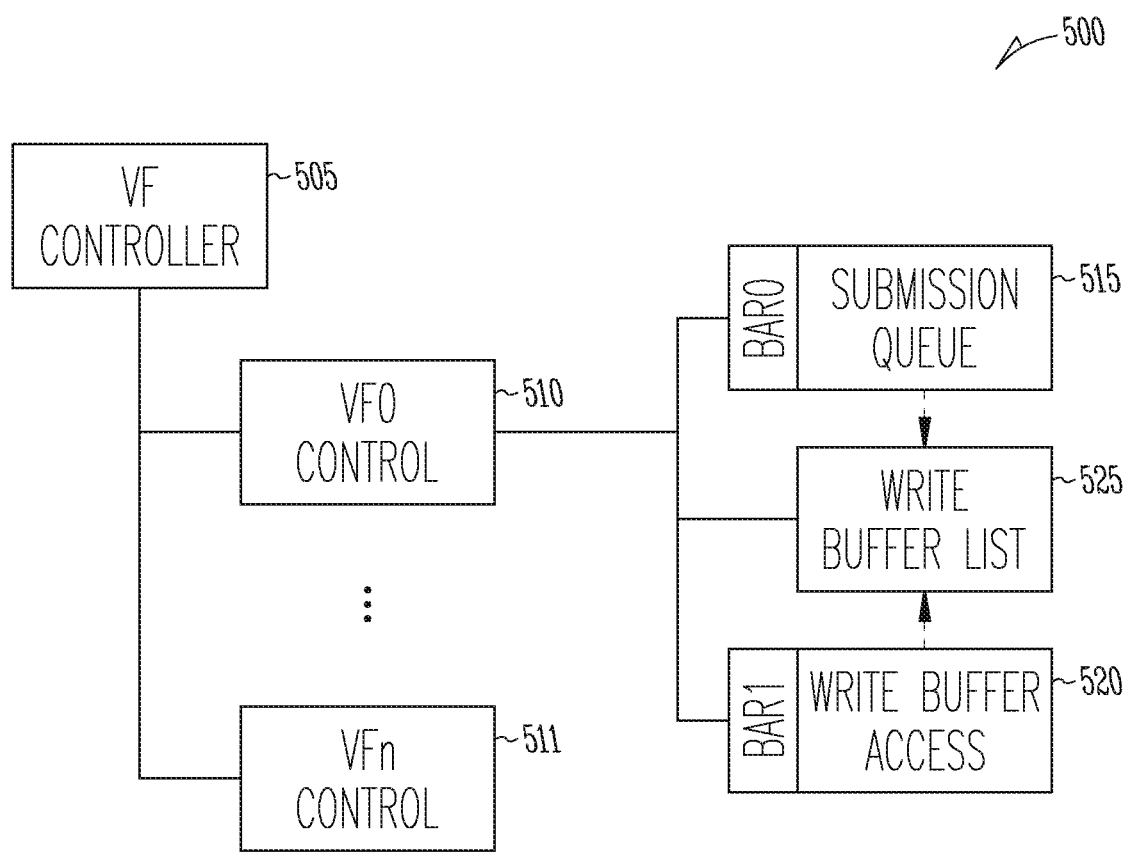
FIG. 5 illustrates example submission queue (SQ) and write buffer (WB) access elements organized within a virtual function (VF).

FIG. 5 illustrates an example submission queue (SQ) element 515 and a write buffer (WB) access element 520 organized within a set of virtual functions (VFs) 500. In an example, the set of VFs can include a plurality of VFs, such as VF0, $VF_n$, etc. A VF controller 505 can manage the configuration of the set of VFs, and can include separate control units, such as VF0 control 510, $VF_n$ control 511, etc. In an example, a submission queue 515 can include one or more submission queue elements (SQEs) written using a base address register #0 (BAR0), and a write buffer access 520 can include one or more logical blocks of write data written, for example, to one or more write buffers (WBs) using a base address register #1 (BAR1). A write buffer list (WBL) 525 can coordinate the SQEs with respective WBs.

Figure 6:
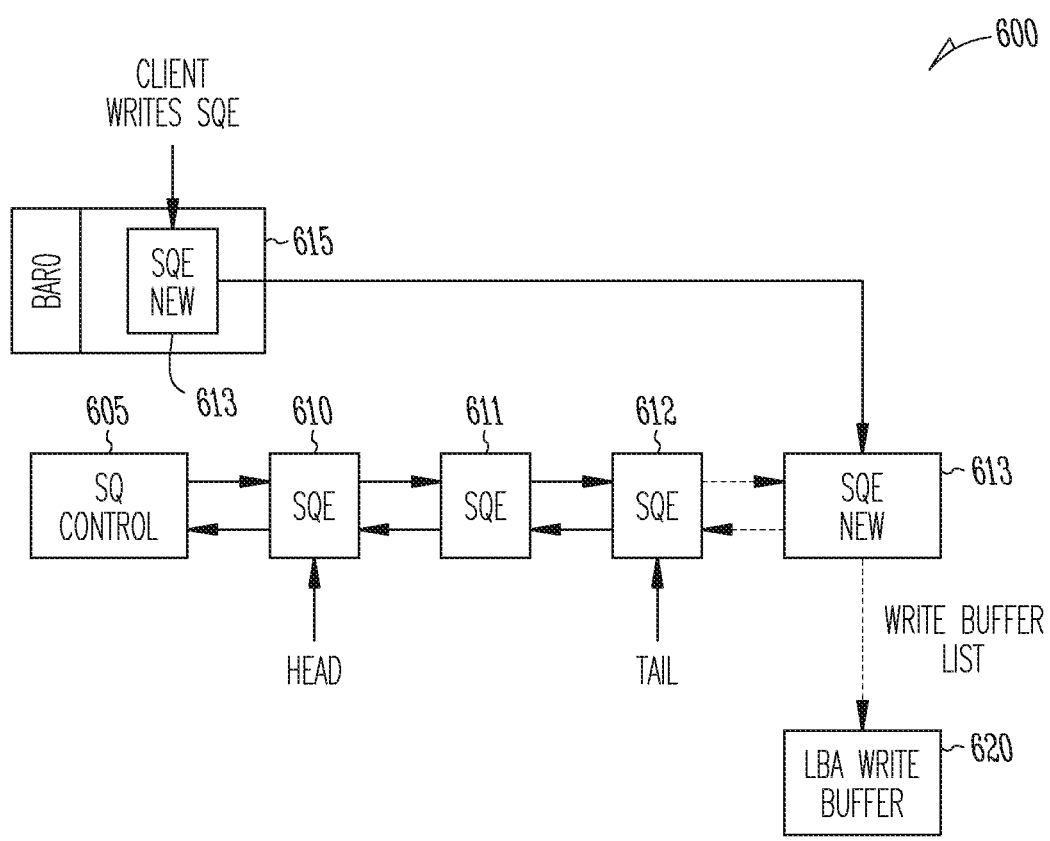
FIG. 6 illustrates an example submission queue (SQ) with dynamic submission queue entries (SQEs).

FIG. 6 illustrates an example submission queue (SQ) 600 for a virtual function (VF) with dynamic allocation of submission queue entries (SQEs) 610-613. A submission queue (SQ) element 615 (e.g., of a submission queue (SC) circuit, etc.) can receive a new SQE 13 from a client device using, for example, a base address register #0 (BAR0) of a communication interface or VF. In an example, a host interface circuit can dynamically allocate a write buffer (WB) 620, such as from a set of available write buffers (WBs), attach the WB 620 to the new SQE 613, and add the new SQE 613 to the end of the SQ 600 (e.g., at a tail of the SQ 600). In an example, a host interface circuit can send a command failure, e.g., to the client device or the VF, if there are insufficient resources to create the SQE entry in the SQ. The SQ 600 can further include an SQ control element 605. In an example, an initial logical block address (LBA) WB can be attached to a write buffer list (WBL).

In an example, a submission queue entry (SQE) can include client SQE area and additional controller specific area. The client SQE area can include, for example, area for one or more of: operation code; a command ID (CID); a starting LBA; a transfer size; a controller memory buffer (CMB) flag; a CMB pointer/offset; a host SGL/PRP address; metadata; or one or more other type of data or information. The controller specific area can include, for example, area for one or more of: a WBL pointer; a flag indicating use of CMB vs client memory for a write source; status flags for "data ready to commit", "all data available"; or one or more other type of data or information.

Figure 7:
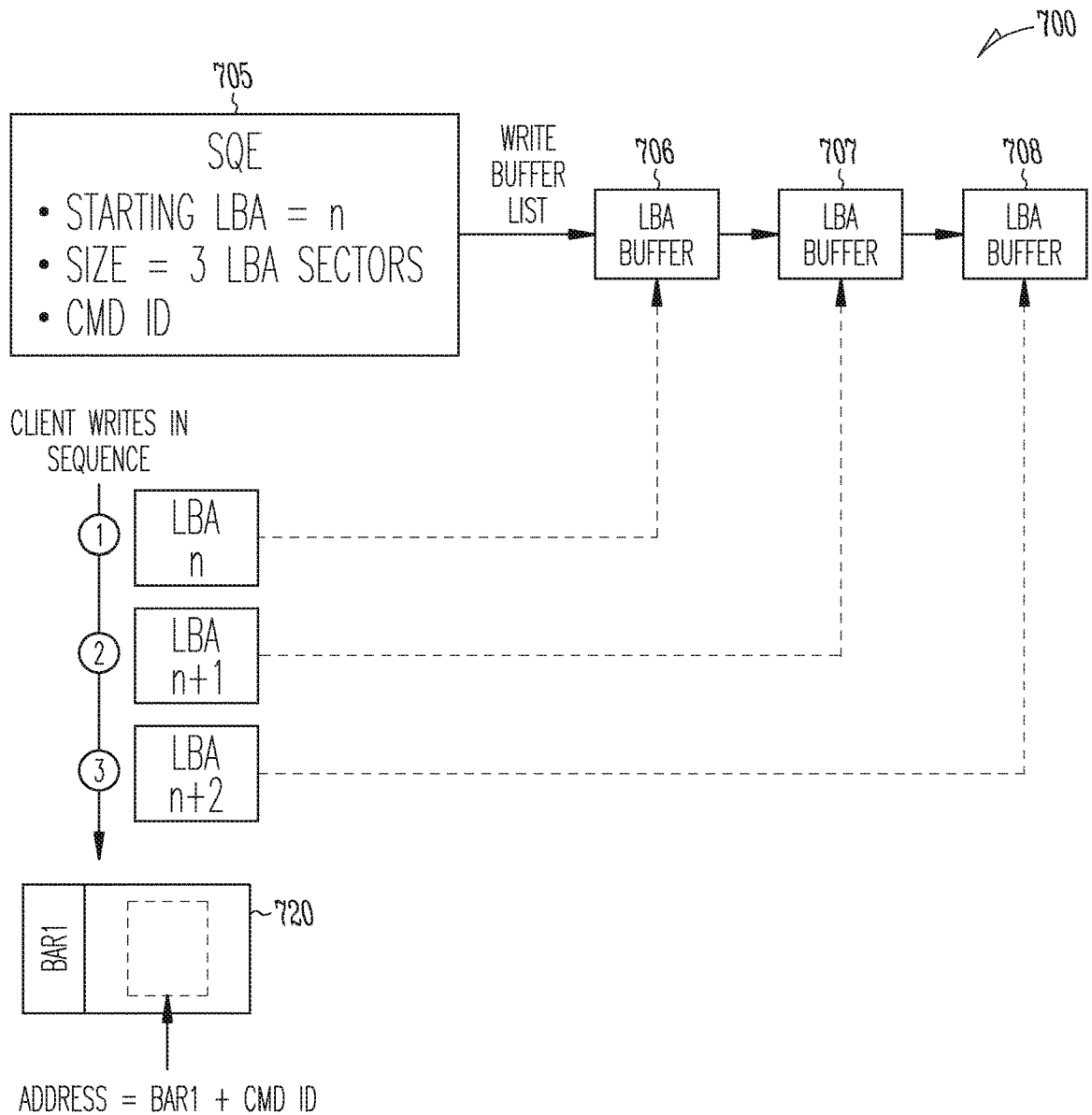
FIG. 7 illustrates an example write data access structure.

FIG. 7 illustrates a first example write data access structure 700 including a submission queue entry (SQE) 705 and logical block address buffers 706, 707, 708. In an example, the SQE 705 can include a starting LBA, size, and CID.

For write commands, the SQE 705 can include a flag (e.g., a "Use CMB flag") indicating the origin of the data, for example, from client memory or from a controller memory buffer (CMB). The use of CMB for write data can be provided on a best-effort basis. If there are sufficient resources in the CMB for the SQE 705, the CMB can be used to transfer write data to the non-volatile memory (NVM) device. If there are insufficient resources in the CMB for the SQE 705, then an NVM controller, host interface circuit, or virtual function (VF) controller can fall back to using the client memory as a write data source, for example, using the SGL/PRP references in the SQE 705.

When the CMB is selected, a write buffer (WB) module can be engaged. A host interface circuit can manage dynamic allocation of write buffers (WBs) to the SQE 705, and can link the allocated WBs for the SQE 705 to a write buffer list (WBL).

The controller WB area can be memory mapped to a base address area (BAR) of a VF, such as a base address register #1 (BAR1) 720. The BAR1 720 can be used to access write data buffers. Each logical block address (LBA), or logical block of write data, can be written by a client device in sequence to the BAR1 720. For example, the client device can write LBAn, LBAn+1, LBAn+2, etc., sequentially to LBA buffers 706, 707, 708, etc. The LBA can be offset by a command (CMD) ID or one or more other offsets, for example, from the SQE 705, such as to allow a controller to associate the write data buffers to the related SQE. As each buffer is filled, a new buffer can be allocated.

In certain examples, the LBA can be maintained by its placement in the sequence relative to a starting LBA. In certain examples, the client device can include the LBA number as metadata with the client user data. In an example, explicit determination of the LBA number can be required for error detection (e.g., cyclic redundancy check (CRC), etc.) to cover both client data and the LBA number in a single pass. Each buffer can be added to the end of a write buffer list (WBL) in sequence. When the last buffer has been filled, the SQE can be sent to a media management system (MMS) for committing to memory, such as an NVM media device. Further, in certain examples, access methods can be performed for bounds checking and resource limit checking.

In an example, if there are no buffers available, or if a host interface circuit, in allocating write buffers for an SQE, has an insufficient number of buffers available, an error condition can be returned to the client device. In an example, the error condition can include an intermediate completion, indicating the last valid LBA number committed to memory (e.g., to the NVM media device). In response, the host interface circuit, or an NVM controller, can switch modes to pull the remaining write data from the client memory space, such as using direct memory gather operations according to SGL/PRP pointers from the SQE. In certain examples, if the client device continues to write additional data after the SQE command has switched modes, such additional data can be dropped without additional notification to the client device.

Although allocated WBs for a single SQE are described above as having physical contiguity in the BAR memory space, in other examples, such WBs can be scattered in the BAR memory space, and do not require such contiguity. Further, in certain examples, the LBA size can be bigger than, the same size as, or smaller than the WBs, or vice versa, such that a single WB can transfer one or more logical blocks of write data, or that one or more WBs may be required to transfer one or more logical blocks of write data.

FIGS. 8-11 illustrate a second write data access structure including a base address register (BAR) and a set of write buffers (WBs).

Figure 8:
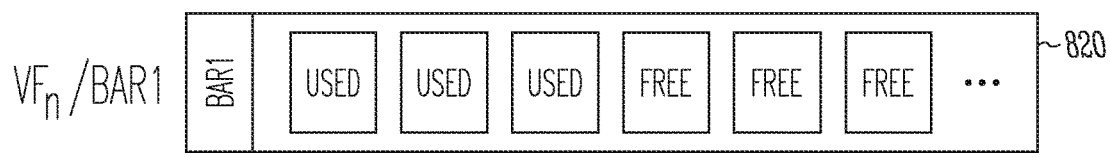
FIGS. 8-11 illustrate a second write data access structure including a base address register (BAR) and a set of write buffers (WBs).
Figure 9:
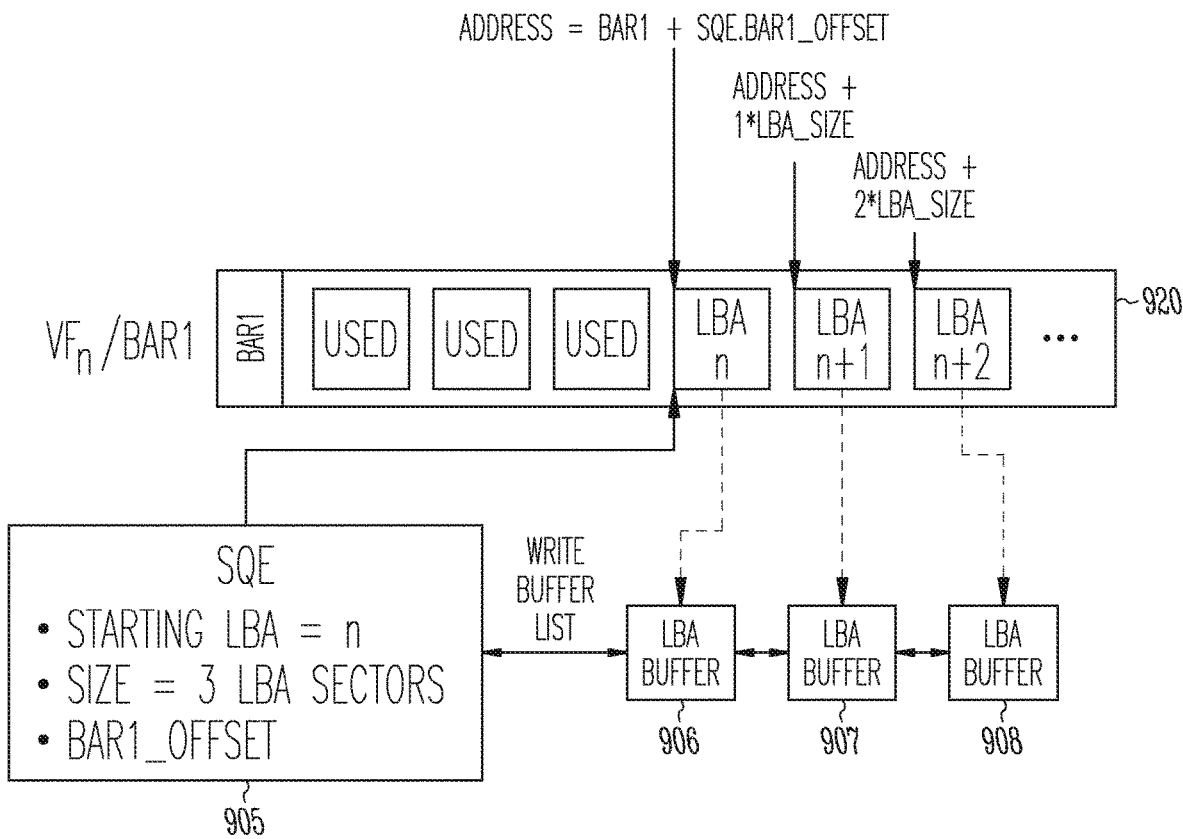

FIGS. 8-9 illustrate example BARs 820, 920 including three used WBs and three free WBs in a BAR #1 (BAR1) space for a specific virtual function ($VF_n$). A client device can identify a free region in the BAR1 memory map of contiguous size greater than or equal to the required number of logical block address (LBA) sectors for a specific submission queue entry (SQE). For example, for an SQE including three LBA sectors, the client device can identify a free region having a sufficient number of free WBs, such as between the used and free WBs in the BAR 820.

FIG. 9 illustrates an example SQE 905 with a starting LBA of LBAn, a size of 3 LBA sectors, and starting position of BAR1_Offset. A write buffer list (WBL) can manage logical blocks of write data associated with the SQE 905, e.g., first, second, and third LBA buffers 906, 907, 908. The address of each WB can be managed, for example, in the WBL, etc. The starting logical block address LBAn, "ADDRESS" can be equal to BAR1+SQE.BAR1_Offset, and subsequent WBs can be addressed accordingly, e.g., LBAn+1 at ADDRESS+1*LBA_SIZE, LBAn+2 at ADDRESS+2*LBA_SIZE, etc.

Figure 10:
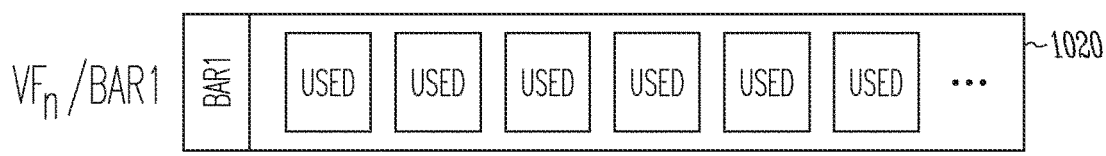

FIG. 10 illustrates an example BAR 1020 in use, including six used WBs in the BAR1 space for the $VF_n$, such as to write the data associated with the SQE 905 of FIG. 9 in a media management system (MMS), a non-volatile memory (NVM), etc.

Figure 11:
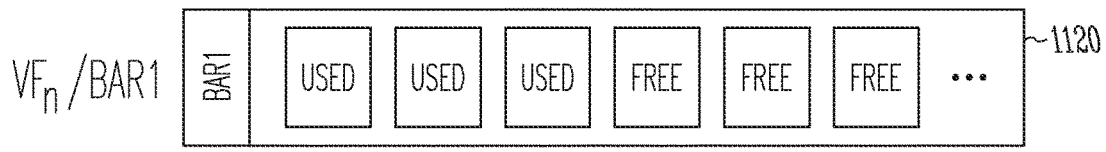

FIG. 11 illustrates an example BAR 1120 after completion of a transaction, such as writing data associated with the SQE 905 of FIG. 9, including three used WBs in the BAR1 space for the $VF_n$.

Figure 12:
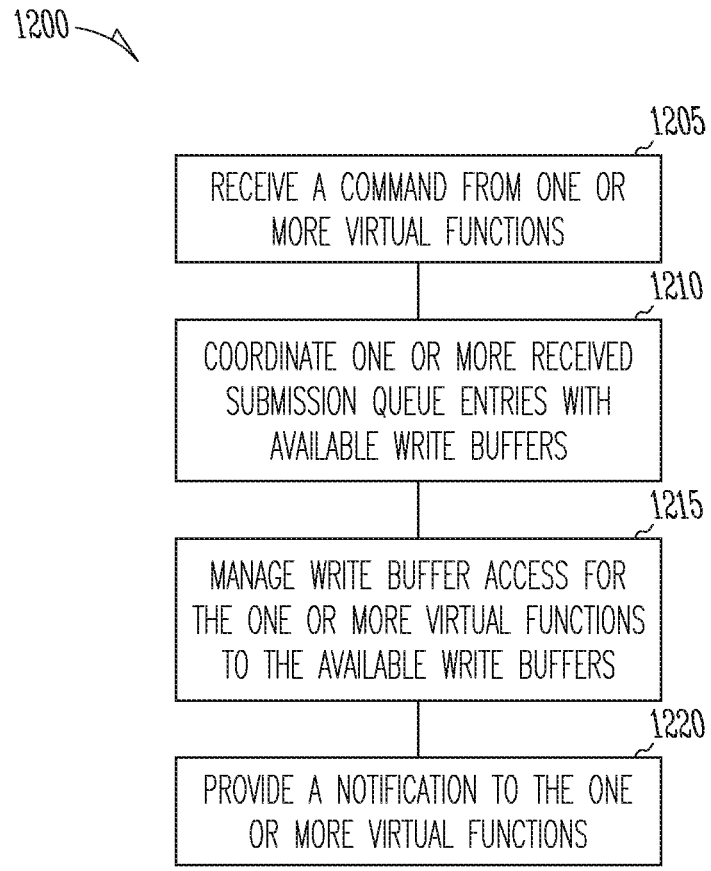
FIG. 12 illustrates an example method to control communication between one or more virtual functions (VFs) and a media management system (MMS).

FIG. 12 illustrates an example method 1200 to control communication, such as a write operation, between one or more virtual functions (VFs) and a media management system (MMS), for example, using a host interface circuit.

In an example, a client device can issue a command by writing a new submission queue entry (SQE) to a base address register (BAR), such as base address register #0 (BAR0) of a VF, using a communication interface, such as a peripheral component interconnect express (PCIe) interface (e.g., a PCIe endpoint).

At 1205, a command can be received from one or more VFs, such as a write command, including one or more submission queue entries (SQEs) to write data to the MMS, including, for example, one or more non-volatile memory (NVM) media devices. In an example, a host interface circuit can include a submission queue (SQ) circuit configured to receive the one or more SQEs from the one or more VFs, and to manage a SQ of the host interface circuit. In other examples, the host interface circuit can receive one or more other commands, such as a write command, etc.

At 1210, one or more received SQEs can be coordinated with available write buffers (WBs), for example, from a set of available WBs of the host interface circuit. In an example, the host interface circuit can include a write buffer list (WBL) circuit configured to manage a set of WB associated with the host interface circuit.

In an example, received SQEs can be associated with a specific number of WBs. When there are sufficient resources in the host interface circuit to hold the one or more received SQEs in the SQ, including, for example, sufficient available WBs to hold, manage, or receive data associated with the one or more received SQEs, the one or more SQEs can be added to the SQ. In an example, the SQ circuit can add the one or more received SQEs to the SQ. In contrast, when there are not sufficient resources in the host interface circuit to hold the one or more received SQEs in the SQ, including, for example, insufficient available WBs to hold, manage, or receive data associated with the one or more received SQEs, the one or more SQEs may not be added to the SQ, and notification of such can be provided to the one or more VFs, to the client device, etc.

At 1215, WB access for the one or more VFs to the available WBs can be managed, for example, using a WB access circuit. For example, when there are sufficient resources to hold the one or more received SQEs in the SQ, the WB access circuit can be configured to provide access to write data from the client device or the one or more VFs, such as using a BAR, such as a base address register #1 (BAR1), of the communication interface.

In an example, each SQE can require a certain number of WBs of the host interface circuit to hold the write data associated with the SQE. When an SQE is received, requiring a certain number of WBs, and that number of WBs are available, the WB access circuit can provide access to write data to the available WBs. As data is written from an individual WB to the MMS, the individual WB is free to receive additional write data. In certain examples, data can be written from the individual WB to the MMS prior to receiving all write data associated with SQE of the individual WB. In an example, the host interface circuit can receive and accept a write command, even though the write command requires more WBs to fully execute than are currently available, as individual WBs can be freed to receive additional write data as data is written to the MMS. In other examples, if the write command requires more WBs to fully execute than are currently available, or if the number of WBs required exceeds the available WBs by a threshold, one or more traditional data transfer schemes can be implemented, such as traditional interrupts, pulling data directly from host memory into WBs, etc.

At 1220, a notification can be provided to the one or more VFs, for example, indicating a successful data write to the MMS, command failure, etc. Notifications can be provided using a command queue manager circuit. If there are insufficient available WBs to hold, manage, or receive data associated with one or more received SQEs, the command queue manager circuit can provide a command completion notification to the communication interface, reflecting a command failure.

In certain examples, the underlying methods described herein can be extended to one or more other specifications, including, for example, an NVM express (NVMe) interface to communicate according to an NVMe specification.

Figure 13:
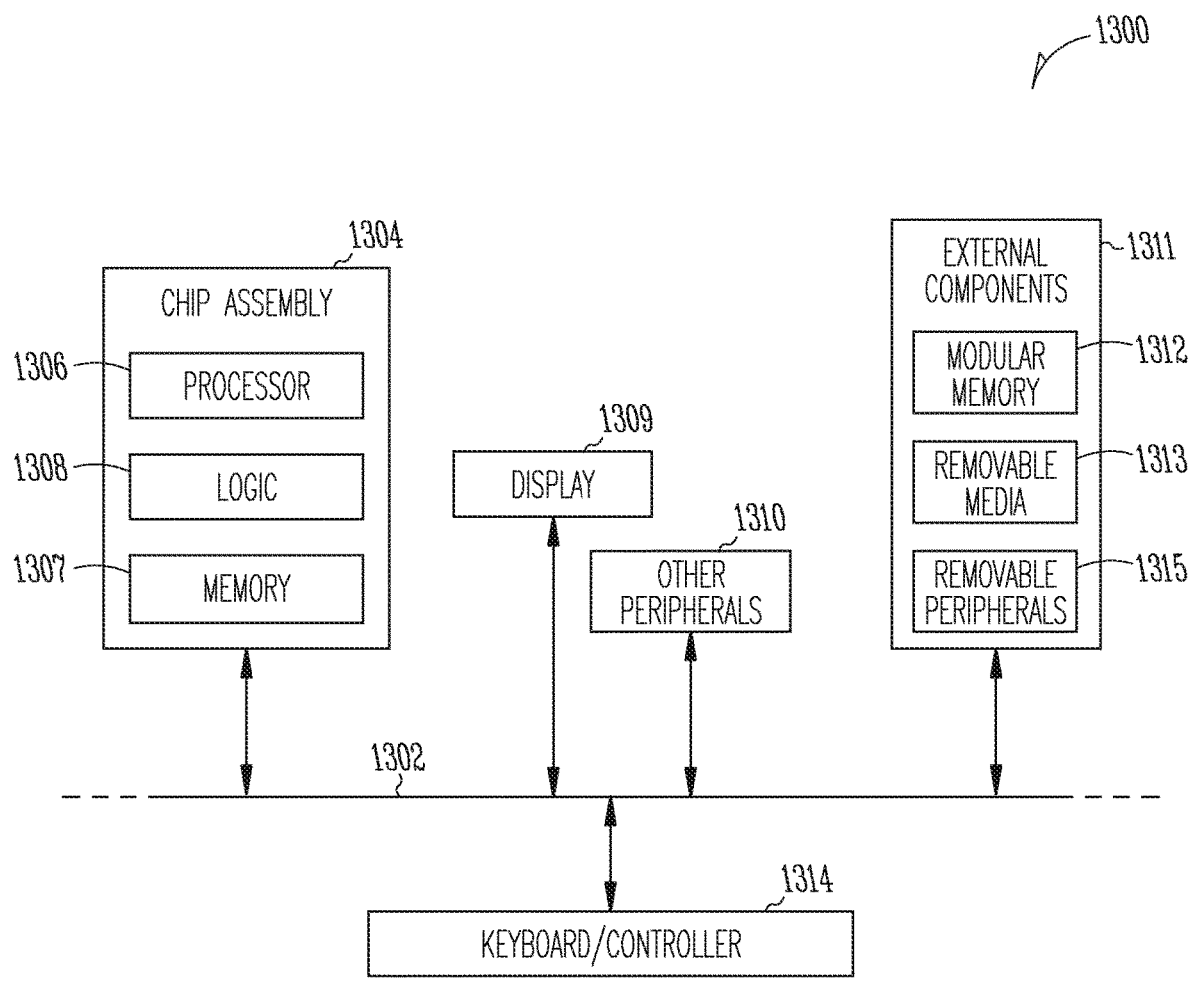
FIG. 13 illustrates an example block diagram of an information handling system.

FIG. 13 illustrates an example block diagram of an information handling system 1300 incorporating at least one chip or chip assembly 1304 that includes a memory device 1307 according to an embodiment of the invention. In an example, the memory device 1307 can include a plurality of stacked arrays of memory cells, or one or more non-volatile memory (NVM) media devices, such as described herein.

The information handling system 1300 illustrated in FIG. 13 can include an electronic computing device, such as a desktop or laptop computer, a tablet computer, a mobile electronic device or smart phone, a gaming console, a vehicle or aircraft, or one or more other electronic device or electronic device components.

The information handling system 1300 includes a system bus 1302 configured to provide communication across various components of the information handling system 1300. The system bus 1302 can be implemented as a single bus, or as a combination of busses.

The chip assembly 1304 can include a processor 1306, one or more additional logic chips 1308, or one or more other components. The one or more additional logic chips 1308 can include, among other things, an analog-to-digital converter (ADC), or one or more other circuits, such as an application-specific integrated circuit (ASIC), etc.

The information handling system 1300 can include one or more external components 1311, such as external memory, which in turn, can include a modular memory 1312, such as one or more hard drives, etc., or one or more removable media 1313 or removable peripherals 1315, such as compact disks (CDs), digital video disks (DVDs), flash drives, and the like. In certain examples, one or more of the memory devices described herein can be one or more the external components 1311.

The information handling system 1300 can also include a display 1309, a keyboard/controller 1314 (e.g., a mouse, touch screen, touch pad, or other user input device), or one or more other peripheral components 1310 (e.g., speakers, microphones, cameras, etc.).

ADDITIONAL NOTES AND EXAMPLES

An example (e.g., "Example 1") of subject matter (e.g., a system) may include a host interface circuit configured to control communication between a set of virtual functions (VFs) and a media management system (MMS). The host interface circuit may include a command queue manager circuit configured to consolidate commands from the set of VFs, to dynamically allocate write buffers (WBs) from a set of available WBs to the set of VFs using the commands, and to provide commands to the MMS. For each VF in the set of VFs, the host interface circuit may include: a VF submission queue circuit configured to manage a submission queue (SQ) for a respective VF from the set of VFs, and to receive a command from the respective VF, including one or more submission queue entries (SQEs), and a VF write buffer list (WBL) circuit configured to manage a list of pending writes for the respective VF and to coordinate the one or more received SQEs with allocated WBs. The host interface circuit may include a WB access circuit configured to manage WB access for the set of VFs and to provide write data to the MMS.

In Example 2, the subject matter of Example 1 may optionally be configured such that the VF submission queue circuit is configured to determine if there are sufficient resources to hold the one or more received SQEs in the SQ, wherein, if there are sufficient resources to hold the one or more received SQEs in the SQ, the VF submission queue circuit is configured add the one or more received SQEs to the SQ, and if there are insufficient resources to hold the one or more received SQEs in the SQ, the command queue manager circuit is configured to provide a command failure notification.

In Example 3, the subject matter of any one or more of Examples 1-2 may optionally be configured such that each SQE requires a certain number of allocated WBs to provide write data to the MMS, and the allocated WBs are free to receive additional write data after write data is provided to the MMS.

In Example 4, the subject matter of any one or more of Examples 1-3 may optionally be configured such that a first allocated WB is configured to receive initial write data corresponding to an SQE and to provide the initial write data to the MMS before receipt of all logical blocks of data associated with the SQE to the allocated WBs.

In Example 5, the subject matter of any one or more of Examples 1-4 may optionally be configured to include a non-volatile memory (NVM) controller, including: the host interface circuit; a communication interface; and the MMS, wherein the MMS is configured to be coupled to a NVM media device, the host interface circuit is configured to control communication between a client device and the set of VFs using a communication interface, and the communication interface includes a peripheral component interconnect express (PCIe) interface.

In Example 6, the subject matter of any one or more of Examples 1-5 may optionally be configured such that the VF submission queue circuit is configured to receive the one or more SQEs and to receive write data using one or more base address registers (BARs) of a communication interface.

In Example 7, the subject matter of any one or more of Examples 1-6 may optionally be configured such that the command queue manager circuit is configured to receive a read command from the respective VF, to send the read command to the MMS, to receive read data from the MMS corresponding to the read command, and to provide read data to the respective VF.

An example (e.g., "Example 8") of subject matter (e.g., a method to control communication between a set of virtual functions (VFs) and a media management system (MMS)) may include consolidating commands from the set of VFs and dynamically allocating write buffers (WBs) from a set of available WBs to the set of VFs using the commands using a command queue manager circuit; for each VF in the set of VFs: managing a submission queue (SQ) for a respective VF from the set of VFs, and receiving a command from the respective VF, including one or more submission queue entries (SQEs), using a VF submission queue circuit; and managing a list of pending writes for the respective VF and coordinating the one or more received SQEs with allocated WBs using a VF write buffer list (WBL) circuit; and managing WB access for the set of VFs and providing write data to the MMS using a WB access circuit.

In Example 9, the subject matter of Example 8 may optionally be configured to include determining if there are sufficient resources to hold the one or more received SQEs in the SQ; and if there are sufficient resources to hold the one or more received SQEs in the SQ, adding the one or more received SQEs to the SQ using the VF submission queue circuit; or if there are insufficient resources to hold the one or more received SQEs in the SQ, providing a command failure notification using the command queue manager circuit.

In Example 10, the subject matter of any one or more of Examples 8-9 may optionally be configured such that managing WB access for the set of VFs includes: receiving write data corresponding to an SQE at an allocated WB; and providing write data from the allocated WB to the MMS, wherein each SQE requires a certain number of allocated WBs to provide write data to the MMS, and the allocated WBs from the set of WBs are free to receive additional write data after write data is provided to the MMS.

In Example 11, the subject matter of any one or more of Examples 8-10 may optionally be configured to include receiving initial write data corresponding to an SQE at a first allocated WB; and providing the initial write data from the allocated WB to the MMS after write data for the allocated WB is received, before the set of WBs receives all logical blocks associated with the SQE of the individual WB.

In Example 12, the subject matter of any one or more of Examples 8-11 may optionally be configured to include controlling communication between a client device and the set of VFs using a peripheral component interconnect express (PCIe) interface, wherein providing write data to the MMS includes providing write data to a non-volatile memory (NVM) device.

In Example 13, the subject matter of any one or more of Examples 8-12 may optionally be configured such that receiving the one or more SQEs and managing WB access for the set of VFs includes using one or more base address registers (BARs) of a communication interface.

An example (e.g., "Example 14") of subject matter (e.g., at least one machine-readable medium) may include instructions that, when executed by processing circuitry of a host interface circuit, cause the host interface circuit to control communication between a set of virtual functions (VFs) and a media management system (MMS), including to: consolidate commands from the set of VFs; dynamically allocate write buffers (WBs) from a set of available WBs to the set of VFs using the commands; for each VF in the set of VFs: manage a submission queue (SQ) for a respective VF from the set of VFs; receive a command from the respective VF, including one or more submission queue entries (SQEs); and coordinate the one or more received SQEs with allocated WBs; and manage WB access for the set of VFs and provide write data to the MMS using the allocated WBs.

In Example 15, the subject matter of Example 14 may optionally be configured to include instructions that, when executed by the processing circuitry of the host interface circuit, cause the host interface circuit to: determine if there are sufficient resources to hold the one or more received SQEs in the SQ; and if there are sufficient resources to hold the one or more received SQEs in the SQ, add the one or more received SQEs to the SQ; or if there are insufficient resources to hold the one or more received SQEs in the SQ, provide a command failure notification.

In Example 16, the subject matter of any one or more of Examples 14-15 may optionally be configured such that the instructions that, when executed by the processing circuitry of the host interface circuit, cause the host interface circuit to manage WB access for the one or more VFs to the available WBs include instructions to: receive write data corresponding to an SQE at an allocated WB; and provide write data from the allocated WB to the MMS, wherein each SQE requires a certain number of allocated WBs to provide write data to the MMS, and the allocated WBs from the set of WBs are free to receive additional write data after write data is provided to the MMS.

In Example 17, the subject matter of any one or more of Examples 14-16 may optionally be configured to include instructions that, when executed by the processing circuitry of the host interface circuit, cause the host interface circuit to: receive initial write data corresponding to an SQE at a first allocated WB; and provide the initial write data from the allocated WB to the MMS after write data for the allocated WB is received, before the set of WBs receives all logical blocks associated with the SQE of the individual WB.

In Example 18, the subject matter of any one or more of Examples 14-17 may optionally be configured to include instructions that, when executed by the processing circuitry of the host interface circuit, cause the host interface circuit to: control communication between a client device and the set of VFs using a peripheral component interconnect express (PCIe) interface.

In Example 19, the subject matter of any one or more of Examples 14-18 may optionally be configured such that the instructions that, when executed by the processing circuitry of the host interface circuit, cause the host interface circuit to: receive the one or more SQEs and receive write data from one or more base address registers (BARs) of a communication interface.

In Example 20, the subject matter of any one or more of Examples 14-19 may optionally be configured to include instructions that, when executed by the processing circuitry of the host interface circuit, cause the host interface circuit to: receive a read command from the respective VF; send the read command to the MMS; receive read data from the MMS corresponding to the read command; and provide read data to the respective VF.

An example (e.g., "Example 21") of subject matter (e.g., a system or apparatus) may optionally combine any portion or combination of any portion of any one or more of Examples 1-20 to include "means for" performing any portion of any one or more of the functions or methods of Examples 1-20, or a "machine-readable medium" (e.g., non-transitory, etc.) including instructions that, when performed by a machine, cause the machine to perform any portion of any one or more of the functions or methods of Examples 1-20.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim.

In various examples, the components, controllers, processors, units, engines, or tables described herein can include, among other things, physical circuitry or firmware stored on a physical device (e.g., a controller can include a control circuit, etc.). As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, or media device, as used herein, includes reading from, writing to, or erasing the memory cell or media device. The operation of placing a memory cell or media device in an intended state is referred to herein as "programming," and can include both writing to or erasing from the memory cell or media device (i.e., the memory cell may be programmed to an erased state).

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
 a host interface circuit to control communication between a set of virtual functions (VFs) and a media management system (MMS), the host interface circuit comprising:
  a command queue manager circuit to consolidate commands from the set of virtual functions, to dynamically allocate write buffers (WBs) from a set of available write buffers to the set of virtual functions using the commands, and to provide commands to the media management system;
 for each virtual function in the set of virtual functions:
  a virtual function submission queue circuit to manage a submission queue (SQ) for a respective virtual function from the set of virtual functions, and to receive a command from the respective virtual function comprising one or more submission queue entries (SQEs); and
  a virtual function write buffer list (WBL) circuit to manage a list of pending writes for the respective virtual function and to coordinate the one or more submission queue entries with allocated write buffers; and
 a write buffer access circuit to manage write buffer access for the set of virtual functions and to provide write data to the media management system by:
  receiving write data corresponding to a submission queue entry at an allocated write buffer; and
  providing write data from the allocated write buffer to the media management system, wherein each submission queue entry receives a certain number of allocated write buffers to provide write data to the media management system, and wherein the allocated write buffers from the set of available write buffers are free to receive additional write data after write data is provided to the media management system.

2. The system of claim 1, wherein the virtual function submission queue circuit is further to determine if there are sufficient resources to hold the one or more submission queue entries in the submission queue,
wherein, if there are sufficient resources to hold the one or more submission queue entries in the submission queue, the virtual function submission queue circuit is further to add the one or more submission queue entries to the submission queue, and
wherein, if there are insufficient resources to hold the one or more submission queue entries in the submission queue, the command queue manager circuit is further to provide a command failure notification.

3. The system of claim 1, wherein each submission queue entry uses a certain number of allocated write buffers to provide write data to the media management system, and
wherein the allocated write buffers are free to receive additional write data after write data is provided to the media management system.

4. The system of claim 1, further comprising a first allocated write buffer to receive a first logical block of data and to provide the first logical block of data to the media management system before all logical blocks of data associated with a first submission queue entry are provided to an allocated first plurality of write buffers.

5. The system of claim 1, further comprising:
a non-volatile memory controller, comprising:
the host interface circuit;
a communication interface; and
the media management system,
wherein the media management system is configured to be coupled to a non-volatile memory media device,
wherein the host interface circuit is configured to control communication between a client device and the set of virtual functions using the communication interface, and
wherein the communication interface comprises a peripheral component interconnect express (PCIe) interface.

6. The system of claim 1, wherein the virtual function submission queue circuit is configured to receive the one or more submission queue entries and to receive write data using one or more base address registers (BARs) of a communication interface.

7. The system of claim 1, wherein the command queue manager circuit is configured to receive a read command from the respective virtual function, to send the read command to the media management system, to receive read data from the media management system corresponding to the read command, and to provide read data to the respective virtual function.

8. A method to control communication between a set of virtual functions (VFs) and a media management system (MMS), the method comprising:
consolidating commands from the set of virtual functions and dynamically allocating write buffers (WBs) from a set of available write buffers to the set of virtual functions using the commands using a command queue manager circuit;
for each virtual function in the set of virtual functions:
managing a submission queue (SQ) for a respective virtual function from the set of virtual functions, and receiving a command from the respective virtual function comprising one or more submission queue entries (SQEs), using a virtual function submission queue circuit; and
managing a list of pending writes for the respective virtual function and coordinating the one or more submission queue entries with allocated write buffers using a virtual function write buffer list (WBL) circuit; and
managing write buffer access for the set of virtual functions and providing write data to the media management system using a write buffer access circuit by:
receiving write data corresponding to a submission queue entry at an allocated write buffer; and
providing write data from the allocated write buffer to the media management system, wherein each submission queue entry receives a certain number of allocated write buffers to provide write data to the media management system, and wherein the allocated write buffers from the set of available write buffers are free to receive additional write data after write data is provided to the media management system.

9. The method of claim 8, further comprising:
determining if there are sufficient resources to hold the one or more submission queue entries in the submission queue; and
if there are sufficient resources to hold the one or more submission queue entries in the submission queue, adding the one or more submission queue entries to the submission queue using the virtual function submission queue circuit; or
if there are insufficient resources to hold the one or more submission queue entries in the submission queue, providing a command failure notification using the command queue manager circuit.

10. The method of claim 8, further comprising:
controlling communication between a client device and the set of virtual functions using a peripheral component interconnect express (PCIe) interface, wherein providing write data to the media management system comprises providing write data to a non-volatile memory device.

11. The method of claim 8, wherein receiving the one or more submission queue entries and managing write buffer access for the set of virtual functions comprises using one or more base address registers (BARs) of a communication interface.

12. At least one non-transitory machine-readable medium comprising instructions that, when executed by processing circuitry of a host interface circuit, cause the host interface circuit to control communication between a set of virtual functions (VFs) and a media management system (MMS) by performing operations comprising:
consolidating commands from the set of virtual functions;
dynamically allocating write buffers (WBs) from a set of available write buffers to the set of virtual functions using the commands;
for each virtual function in the set of virtual functions:
managing a submission queue (SQ) for a respective virtual function from the set of virtual functions;
receiving a command from the respective virtual function comprising one or more submission queue entries (SQEs); and
coordinating the one or more submission queue entries with allocated write buffers; and
managing write buffer access for the set of virtual functions and providing write data to the media management system by:

receiving write data corresponding to a submission queue entry at an allocated write buffer; and providing write data from the allocated write buffer to the media management system, wherein each submission queue entry receives a certain number of allocated write buffers to provide write data to the media management system, and wherein the allocated write buffers from the set of available write buffers are free to receive additional write data after write data is provided to the media management system.

13. The at least one machine-readable medium of claim 12, wherein the operations further comprise:

determining if there are sufficient resources to hold the one or more submission queue entries in the submission queue; and if there are sufficient resources to hold the one or more submission queue entries in the submission queue, adding the one or more submission queue entries to the submission queue; or if there are insufficient resources to hold the one or more submission queue entries in the submission queue, providing a command failure notification.

14. The at least one machine-readable medium of claim 12, wherein the operations further comprise:

controlling communication between a client device and the set of virtual functions using a peripheral component interconnect express (PCIe) interface.

15. The at least one machine-readable medium of claim 12, wherein the operations further comprise:

receiving the one or more submission queue entries and receive write data from one or more base address registers (BARs) of a communication interface.

16. The at least one machine-readable medium of claim 12, wherein the operations further comprise:

receiving a read command from the respective virtual function;

sending the read command to the media management system;

receiving read data from the media management system corresponding to the read command; and providing read data to the respective virtual function.

* * * * *